US009934693B2

(12) United States Patent
Joyson et al.

(10) Patent No.: US 9,934,693 B2
(45) Date of Patent: Apr. 3, 2018

(54) AIRCRAFT TURNAROUND AND AIRPORT TERMINAL STATUS ANALYSIS

(71) Applicant: Honeywell International Inc., Morris Plains, NJ (US)

(72) Inventors: John Premnath Joyson, Reading (GB); Rajesh V. Poojary, Bangalore (IN); Maksood Kadike, Dubai (AE)

(73) Assignee: Honeywell International Inc., Morris Plains, NJ (US)

( * ) Notice: Subject to any disclaimer, the term of this patent is extended or adjusted under 35 U.S.C. 154(b) by 0 days.

(21) Appl. No.: 15/211,556

(22) Filed: Jul. 15, 2016

(65) Prior Publication Data
US 2018/0018882 A1 Jan. 18, 2018

(51) Int. Cl.
*G08G 5/00* (2006.01)
(52) U.S. Cl.
CPC ......... *G08G 5/0026* (2013.01); *G08G 5/0013* (2013.01)
(58) Field of Classification Search
CPC .................. G08G 5/0026; G08G 5/0013
See application file for complete search history.

(56) References Cited

U.S. PATENT DOCUMENTS

| 6,003,009 A | 12/1999 | Nishimura |
| 6,278,965 B1 | 8/2001 | Glass et al. |
| 6,539,337 B1* | 3/2003 | Provan ................ G06F 11/2257 702/183 |
| 7,327,262 B2 | 2/2008 | Motteram et al. |
| 7,734,493 B1* | 6/2010 | Anbil ................ G06Q 10/0631 705/7.22 |
| 7,801,629 B2 | 9/2010 | Hale et al. |

(Continued)

FOREIGN PATENT DOCUMENTS

| CN | 102073937 A | 5/2011 |
| WO | 2012110046 A1 | 8/2012 |
| WO | 2014049624 A1 | 4/2014 |

OTHER PUBLICATIONS

"Aircraft Turnaround Tool", https://www.bytron.aero/aircraft-turnaround/, Apr. 28, 2016, 5 pp.

(Continued)

*Primary Examiner* — Anne M Antonucci
(74) *Attorney, Agent, or Firm* — Brooks, Cameron & Huebsch, PLLC

(57) ABSTRACT

Methods, devices, and systems for generating an aircraft turnaround and airport terminal status analysis are described herein. One device includes a memory, and a processor configured to execute executable instructions stored in the memory to receive flight information and airport terminal information associated with an airport, generate an aircraft turnaround analysis based on the flight information and the airport terminal information, and a user interface to display the aircraft turnaround analysis in a single integrated display. One device includes a memory, and a processor configured to execute executable instructions stored in the memory to receive airport terminal information associated with an airport, generate an airport terminal status analysis based on the airport terminal information, and a user interface to display the airport terminal status analysis in a single integrated display.

20 Claims, 9 Drawing Sheets

(56) References Cited

U.S. PATENT DOCUMENTS

| | | | |
|---|---|---|---|
| 7,813,871 B2 | 10/2010 | Small et al. | |
| 8,134,362 B1 | 3/2012 | Hullender et al. | |
| 8,355,936 B2 | 1/2013 | Altaf et al. | |
| 8,548,720 B2 | 10/2013 | Shukla | |
| 8,700,440 B1 | 4/2014 | Murali et al. | |
| 8,849,560 B2 | 9/2014 | Stefani et al. | |
| 9,509,394 B1* | 11/2016 | Mitchell | H04B 7/18506 |
| 2002/0069293 A1 | 6/2002 | Natalio | |
| 2004/0098237 A1 | 5/2004 | Pendergraft et al. | |
| 2005/0090969 A1 | 4/2005 | Siok et al. | |
| 2006/0095156 A1 | 5/2006 | Baiada et al. | |
| 2009/0187640 A1 | 7/2009 | Delia et al. | |
| 2013/0261956 A1* | 10/2013 | Marks | G01C 21/3423 701/425 |
| 2015/0221225 A1* | 8/2015 | Petersen | G06Q 10/04 701/120 |
| 2015/0239561 A1* | 8/2015 | Hau | B64D 11/00 715/771 |
| 2015/0348422 A1* | 12/2015 | Agrawal | G08G 5/0095 701/120 |
| 2017/0011638 A1* | 1/2017 | Agrawal | G08G 5/0039 |

OTHER PUBLICATIONS

"BlipTrack Queue Forecasting", http://blipsystems.com/bliptrack-queue-forecasting-live/, Apr. 27, 2016, 6 pp.

"Using Trak-a-Line", http://www.atlanta-airport.com/Passenger/waittimes/, Mar. 23, 2016, 2 pp.

Henry, "WhatsBusy Shows You Security Wait Times Before You Get to the Airport", http://lifehacker.com/whatsbusy-shows-you-security-wait-times-before-you-get-1469259385, Nov. 12, 2013, 2 pp.

"Amadeus Connection Manager", http://www.amadeus.com/web/binaries/1333083243431/blobheader=application/pdf&blobheadername1=Content-Disposition&blobheadervalue1=inline%3B+filename%3DAmadeus+Connection+Manager.pdf, Apr. 28, 2014, 2 pp.

Extended Search Report from related European Patent Application No. 17178204, dated Oct. 9, 2017, 6 pages.

* cited by examiner

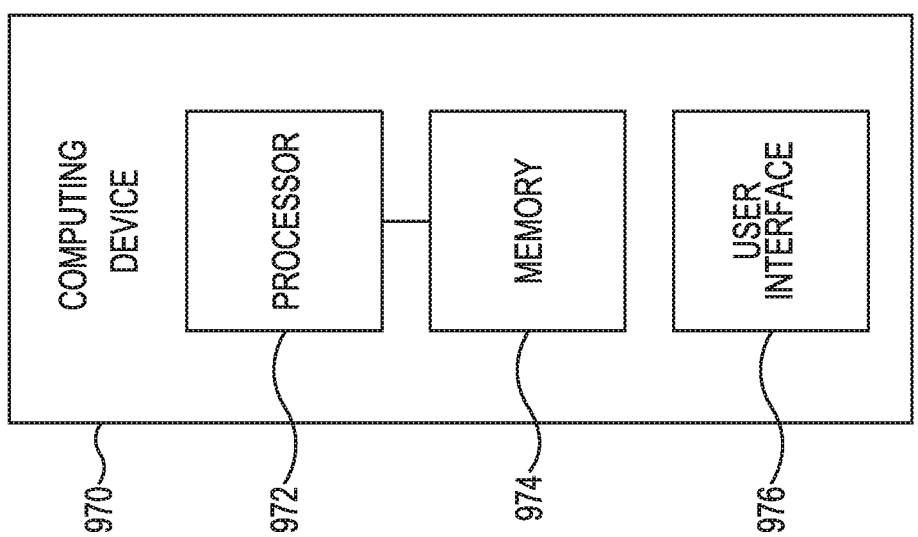

AIRCRAFT TURNAROUND AND AIRPORT TERMINAL STATUS ANALYSIS

TECHNICAL FIELD

The present disclosure relates to methods, devices, and systems for generating an aircraft turnaround and airport terminal status analysis.

BACKGROUND

Aircraft and airport terminal traffic analysis can be a major challenge for airports with significant air traffic and passenger throughput. Maintaining a fast and efficient throughput for both airline traffic associated with an airport and passenger traffic through the airport can reduce delays and costs for airlines and passengers.

Maintaining efficient throughput for both airline traffic and passenger traffic can be challenging. Airports can experience terminal side delays of passenger traffic that can be caused by crowds at airline check-in counters, security gates, airport transit system delays, and/or customs/immigration checkpoints, among other causes of terminal side delays. Airports may also experience airside delays of airline traffic that can be caused by a large volume of air traffic at the airport, and/or can also be a result of the terminal side delays of passenger traffic, among other causes of airside delays. Delays on the airside and/or the terminal side can result in delayed flights, or cause passengers to miss flights altogether. Further, these airside and terminal side delays can propagate to future flights at the airport and/or at other airports as well.

Airport infrastructure is typically fixed. On the airside, an airport infrastructure typically has a fixed number of runways, taxiways, aircraft stands, etc. On the terminal side, an airport infrastructure typically has a fixed number of passenger vehicle parking spaces, airline check-in counters, security gates, customs/immigration counters, boarding gates, etc.

An airport operations center (APOC) for the airport may need to manage an increased airline and passenger throughput with the same fixed airport infrastructure. However, current systems may not provide a user, such as an APOC supervisor, with the information needed to efficiently manage airside and terminal side airport infrastructure. This lack of information can lead to delays for passengers and/or airlines.

BRIEF DESCRIPTION OF THE DRAWINGS

FIG. 9 is a computing device for generating an aircraft turnaround and airport terminal status analysis, in accordance with one or more embodiments of the present disclosure.

DETAILED DESCRIPTION

Figure 1:
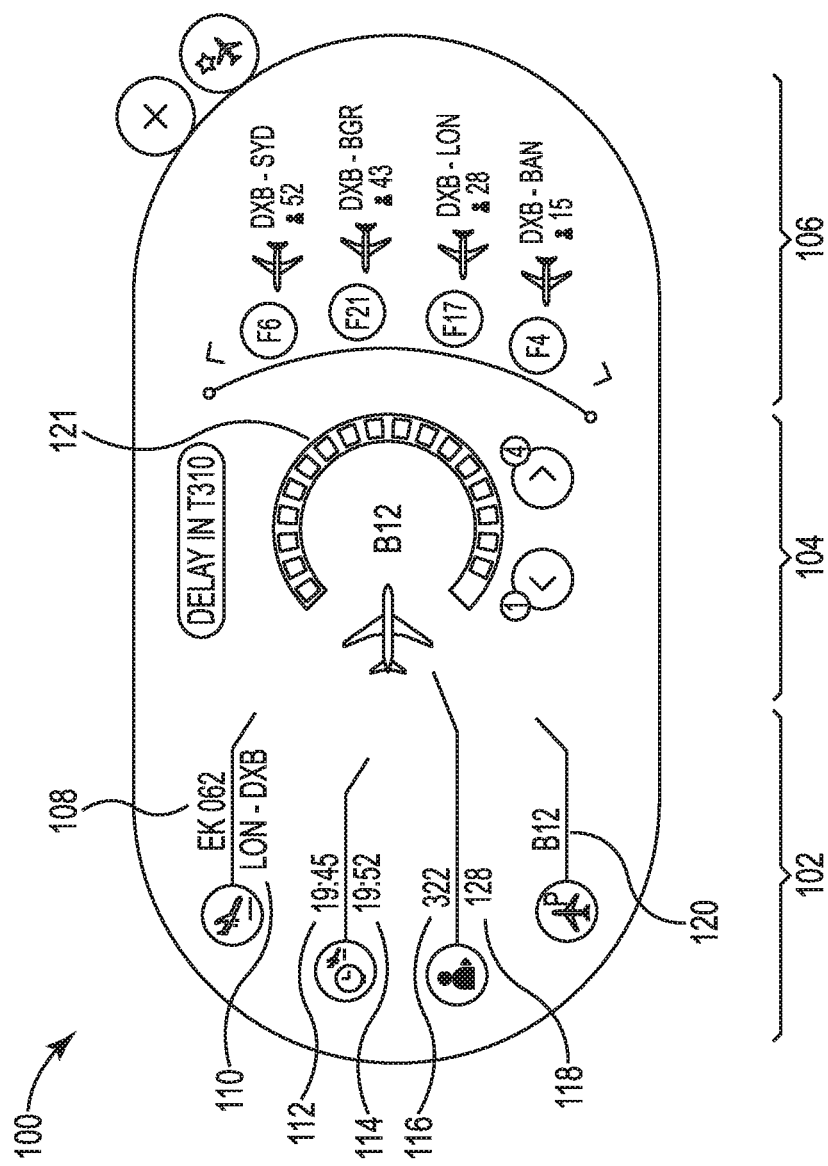
FIG. 1 is an illustration of a display provided on a user interface showing an aircraft turnaround status analysis, generated in accordance with one or more embodiments of the present disclosure.

Methods, devices, and systems for generating an aircraft turnaround and airport terminal status analysis are described herein. In some examples, one or more embodiments include a memory, and a processor configured to execute executable instructions stored in the memory to receive flight information and airport terminal information associated with an airport, generate an aircraft turnaround analysis based on the flight information and airport terminal information, and display the aircraft turnaround analysis in a single integrated display. In some examples, one or more embodiments include a memory, and a processor configured to execute executable instructions stored in the memory to receive airport terminal information associated with an airport, generate an airport terminal status analysis based on the airport terminal information, and display the airport terminal status analysis in a single integrated display.

Aircraft turnaround and airport terminal status analysis, in accordance with the present disclosure, can allow a user, such as an APOC supervisor, to quickly gain situational awareness of airside and/or terminal side airport operations. For example, aircraft turnaround and airport terminal status analysis, in accordance with the present disclosure, can allow a user to determine an expected delay for each aircraft that may be inbound or already at the airport.

Expected delay may include, for instance, a number of passengers on an inbound aircraft and a delay for passengers on the aircraft that may be connecting to other flights. The delay may include, for instance, any expected delay for outbound aircraft that may be experienced as a result of passengers connecting from the inbound aircraft to the outbound aircraft. A user may be able to respond to this information by changing gate allocations for the inbound aircraft to mitigate any potential delays that may be experienced by outbound aircraft.

A user may gain information regarding the turnaround process of an aircraft once the aircraft has arrived at the airport. For example, a user may determine the turnaround status of an aircraft. For instance, a user may gain an understanding of the status of preparations of an aircraft scheduled for an outbound flight. The user may be able to determine a source of any delay and coordinate with others to mitigate the delay so that the aircraft is prepared for an on time departure.

Aircraft turnaround and airport terminal status analysis, in accordance with the present disclosure, can allow a user, such as an APOC supervisor, to quickly gain situational awareness of terminal side airport operations. For example, the user can determine the status of terminal side infrastructure and passenger traffic to coordinate employees and/or infrastructure to prevent and/or mitigate delays. For example, the user can coordinate with employees to open additional checkpoints to mitigate a current delay, or to prevent a predicted delay.

Aircraft turnaround and airport terminal status analysis can be displayed on a single integrated display, which can include monitors and/or displays of mobile devices. Presenting the aircraft turnaround and airport terminal status analysis in a single integrated display can allow the user to quickly determine awareness regarding both terminal side and air side airport operations. The user can then utilize the displayed analysis to quickly decide on terminal side and/or air side infrastructure allocations.

In the following detailed description, reference is made to the accompanying drawings that form a part hereof. The drawings show by way of illustration how one or more embodiments of the disclosure may be practiced.

These embodiments are described in sufficient detail to enable those of ordinary skill in the art to practice one or more embodiments of this disclosure. It is to be understood that other embodiments may be utilized and that process, electrical, and/or structural changes may be made without departing from the scope of the present disclosure.

As will be appreciated, elements shown in the various embodiments herein can be added, exchanged, combined, and/or eliminated so as to provide a number of additional embodiments of the present disclosure. The proportion and the relative scale of the elements provided in the figures are intended to illustrate the embodiments of the present disclosure, and should not be taken in a limiting sense.

The figures herein follow a numbering convention in which the first digit or digits correspond to the drawing figure number and the remaining digits identify an element or component in the drawing. Similar elements or components between different figures may be identified by the use of similar digits. For example, 102 may reference element "02" in FIG. 1, and a similar element may be referenced as 502 in FIG. 5.

As used herein, "a" or "a number of" something can refer to one or more such things. For example, "a number of passengers" can refer to one or more passengers.

FIG. 1 is an illustration of a display provided on a user interface (e.g., user interface 976, as described in connection with FIG. 9) showing an aircraft turnaround status analysis 100, generated in accordance with one or more embodiments of the present disclosure. As shown in FIG. 1, the aircraft turnaround status analysis 100 can include flight information 102 for an inbound flight, assigned gate information 104 for the inbound flight, and connecting flight information 106 for a number of connecting passengers aboard the inbound flight, which can be displayed in a single integrated display, as illustrated in FIG. 1.

The aircraft turnaround status analysis 100 can be generated by a computing device (e.g., computing device 970, as described in connection with FIG. 9) based on flight information and airport terminal information associated with an airport received by the computing device. Flight information and airport terminal information associated with an airport can be received by the computing device from flight information systems associated with the airport and/or other airports, an airport operations database associated with the airport and/or other airports, and/or another third party system. Aircraft turnaround status analysis 100 can be used by a user to gain information regarding the status of airside airport operations, as will be further described herein.

As used herein, a user can be a person associated with the airport. For example, a user can be an employee associated with airport operations for the airport, including airside operations and/or terminal side operations. For instance, an employee can be an APOC supervisor or other APOC employee.

As shown in FIG. 1, aircraft turnaround status analysis 100 can include flight information 102 for an inbound flight. Flight information 102 can include an inbound flight number 108. As used herein, a flight number identifies a particular flight. For example, as shown in FIG. 1, the inbound flight number 108 is indicated as EK 062, indicating the inbound flight is flight 062, operated by Emirates.

Flight information 102 can include an inbound flight route 110. As used herein, a flight route identifies an origin airport and a destination airport, where the origin and destination airports are designated by airport codes. As used herein, an airport code is a code designating a specific airport. For example, as shown in FIG. 1, the inbound flight route indicates the flight departed from LON (e.g., airport code designating all major airports in and/or around London, United Kingdom) and is destined for DXB (e.g., Dubai International Airport, Dubai, United Arab Emirates).

Flight information 102 can include a scheduled inbound flight arrival time 112 and an actual and/or estimated inbound flight arrival time 114. For example, the inbound flight had a scheduled inbound flight arrival time 112 of 19:45. However, the actual inbound flight arrival time 114 of the inbound flight was 19:52, indicating a slight delay in the arrival of the inbound flight from LON to DXB.

Flight information 102 can include a number of total passengers 116 aboard the inbound flight and a number of connecting passengers 118 aboard the inbound flight. For example, the inbound flight has 322 total passengers aboard the inbound flight and, of the 322 total passengers, 128 of the passengers are connecting to other outbound flights.

Flight information 102 can include an assigned gate 120. For example, the inbound flight is currently assigned gate B12. Assigned gate information can be received from flight information systems, an airport operations database associated with the airport and/or other airports, and/or some other third party system.

As shown in FIG. 1, aircraft turnaround status analysis 100 can include assigned gate information 104 for the inbound flight. Assigned gate information 104 can include an assigned gate and corresponding gate number for the inbound flight. As used herein, an assigned gate can be a gate at a terminal of the airport at which the inbound flight, once landed, can be directed towards to allow passengers aboard the inbound flight to disembark the aircraft via a jet bridge or other stair system. For example, as shown in FIG. 1, the assigned gate and corresponding gate number for the inbound flight is gate B12.

Assigned gate information 104 can include delay information 121 for the inbound flight. Delay information 121 for the inbound flight can indicate any potential delay that may be experienced by number of connecting passengers 118 of the inbound flight. For example, delay information 121 for the inbound flight indicates, by the delay meter as shown in FIG. 1, a high likelihood of number of connecting passengers 118 of the inbound flight experiencing a delay when transiting from the gate of the inbound flight (e.g., gate B12) to a boarding gate of an outbound connecting flight. That is, the delay meter as shown in FIG. 1 is close to being filled, indicating a high likelihood of the number of connecting passengers 118 experiencing a delay when transiting from gate B12 of the inbound flight to a boarding gate of a connecting outbound flight. A low likelihood of the number of connecting passengers 118 experiencing a delay when transiting from the gate of the inbound flight to a boarding gate of an outbound connecting flight may be shown by the delay meter being closer to empty. That is, the delay meter can indicate, based on how full the delay meter is, the likelihood of the number of connecting passengers 118 experiencing a delay.

Delays to the number of connecting passengers 118 may be the result of a number of different causes. In some examples, delays to the number of connecting passengers 118 may be the result of lines or queues at a checkpoint. For instance, lines or queues at a security checkpoint may cause passengers to spend more time waiting to pass through airport security, resulting in a delay to their flight.

As used herein, a checkpoint may include an area, place, or point at which a queue or line may form. For example, a checkpoint may include an airline check-in counter (e.g., to check-in to a flight, to receive a boarding pass, to drop off checked luggage, etc.), an airport security gate, a customs/immigration gate/gateway, and/or a boarding gate (e.g., for jet bridge or other access to an aircraft), among other types of checkpoints.

In some examples, delays to the number of connecting passengers 118 may be the result of the location of assigned gate 120 relative to the gates of connecting flights of the number of connecting passengers 118. For example, the distance from the assigned gate 120 (e.g., gate B12) to a gate of a connecting flight (e.g., gate F6) may be longer than the distance from a different gate (e.g., gate F12) to the gate of the connecting flight (e.g., gate F1).

In some examples, delays to the number of connecting passengers 118 may be the result of lines or queues at an airline check-in counter. For instance, lines or queues at an airline check-in counter may cause passengers to spend more time waiting to check-in to their flights, which may result in a longer period of time before passing through airport security, resulting in a delay to their flight.

Although delays to number of connecting passengers 118 are described as resulting from lines or queues at a checkpoint, an airline check-in counter, or geographic locations relative to other gates, embodiments of the present disclosure are not so limited. For example, delays to the number of connecting passengers 118 may be the result of any other cause that might delay the number of connecting passengers 118 from reaching the respective gates of the respective connecting flights in a timely manner.

Although the delay meter is shown in FIG. 1 as indicating a high likelihood of the number of connecting passengers 118 experiencing a delay when transiting from the gate of the inbound flight to a boarding gate of an outbound connecting flight when close to full and a low likelihood of the number of connecting passengers 118 experiencing a delay when transiting from the gate of the inbound flight to a boarding gate of an outbound connecting flight when close to empty, embodiments of the present disclosure are not so limited. For example, the delay meter may use color coding to indicate potential delay. For instance, red may indicate a high potential for delay, yellow may indicate a minor to moderate potential for delay, and green may indicate a low potential for delay. Additionally, a combination of color coding and filling the delay meter may be used to indicate the potential for delay.

As shown in FIG. 1, aircraft turnaround status analysis 100 can include connecting flight information 106 for the number of connecting passengers 118. Connecting flight information 106 can include gate numbers of connecting flights for the number of connecting passengers 118 aboard the inbound flight, flight routes of each respective connecting flight, a number of passengers connecting from the inbound flight to each respective connecting flight, and delay information associated with each respective connecting flight.

Figure 3:
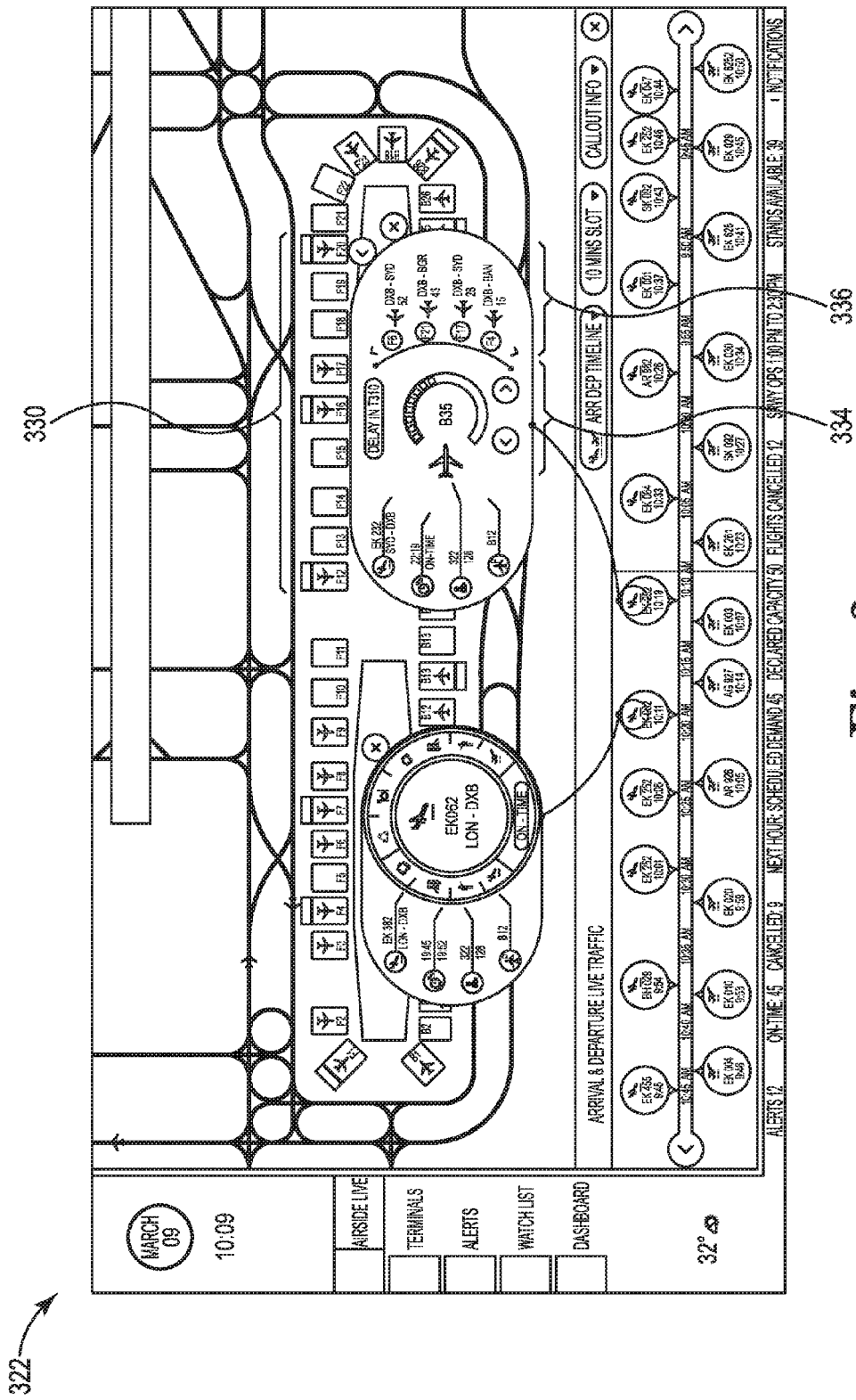
FIG. 3 is an illustration of a display provided on a user interface showing an airport layout including a revised aircraft turnaround status analysis, generated in accordance with one or more embodiments of the present disclosure.

Although not shown in FIG. 1 for clarity and so as not to obscure embodiments of the present disclosure, connecting flight information 106 can show flights which may be impacted as a result of a change of an assigned gate number from a first assigned gate number to a second assigned gate number, as will be further described with respect to FIG. 3.

Connecting flight information 106 can include gate numbers of connecting flights for the number of connecting passengers 118. For example, the number of connecting passengers 118 of the inbound flight is 128. The 128 connecting passengers may be connecting to various other flights that depart from gates different than gate B12 of the inbound flight. In the example shown in FIG. 1, the 128 connecting passengers may be connecting to flights departing from gates F6, F21, F17, and F4.

Although four connecting flights are shown in FIG. 1 and described as the number of connecting passengers 118 connecting to those four connecting flights, embodiments of the disclosure are not so limited. For example, there may be more than four connecting flights associated with the number of connecting passengers 118. A user may scroll through additional connecting flight information associated with the number of connecting passengers 118 in an embodiment including more than four associated connecting flights.

Connecting flight information 106 can include flight routes of the connecting flights, and the number of connecting passengers 118 connecting to each respective connecting flight. For example, the 128 connecting passengers 118 of the inbound flight may be connecting to various other flights that depart from DXB for other destinations.

In the example shown in FIG. 1, 52 connecting passengers are scheduled to depart from gate F6 of DXB and travel to SYD (e.g., Sydney Airport, Sydney, Australia), 43 connecting passengers are scheduled to depart from gate F21 of DXB and travel to BGR (e.g., Bangor International Airport, Bangor, Me., United States), 28 connecting passengers are scheduled to depart from gate F17 of DXB and travel to LON, and 15 connecting passengers are scheduled to depart from gate F4 of DXB and travel to BAN (e.g., Basongo Airport, Basongo, Democratic Republic of the Congo).

Connecting flight information 106 can include delay information associated with each respective connecting flight. Similar to delay information 121, delay information associated with each respective connecting flight can indicate any potential delay that may be experienced by the number of connecting passengers 118 of the inbound flight with respect to each connecting flight. Delay information can be shown by color coding. For example, the aircraft icons located next to gates F6, F21, F17, and F4 can be color coded to indicate a likelihood of the number of connecting passengers 118 experiencing a delay when transiting from the gate of the inbound flight to gates F6, F21, F17, and/or F4. For example, the aircraft icons can be green, indicating a low likelihood of experiencing a delay, yellow for a minor to moderate likelihood of experiencing a delay, and red for a high likelihood of experiencing a delay when transiting from the gate of the inbound flight to gates F6, F21, F17, and/or F4.

The delay information associated with each respective connecting flight can be based on the received assigned gate information 104 of the inbound flight and the airport terminal information. For example, delays to the number of connecting passengers 118 of each respective connecting flight may be a result of lines or queues at a checkpoint (e.g., an airport security gate, a customs/immigration gate, etc.), lines or queues at an airline check-in counter, and/or a geographic location of the gate of the inbound flight (e.g., gate B12) relative to gates of each respective connecting flight (e.g., gates F6, F21, F17, and F4).

A user, such as an APOC supervisor, may change the assigned gate 120 to a different gate to determine the potential delay to the number of connecting passengers 118 at a different gate, as will be further described with respect to FIG. 3.

An aircraft turnaround analysis, such as aircraft turnaround analysis 100 illustrated in FIG. 1, can provide users, such as an APOC supervisor and/or other APOC decision makers, with up to date information regarding the status of airside airport operations in a single integrated display, including airport infrastructure availability and/or infrastructure utilization. The ability to gain situational awareness and up to date information regarding airside airport operations can allow for users to quickly determine where a delay may occur, any reasons for the potential delay, and to execute procedures to mitigate and/or prevent the potential delay.

Figure 2:
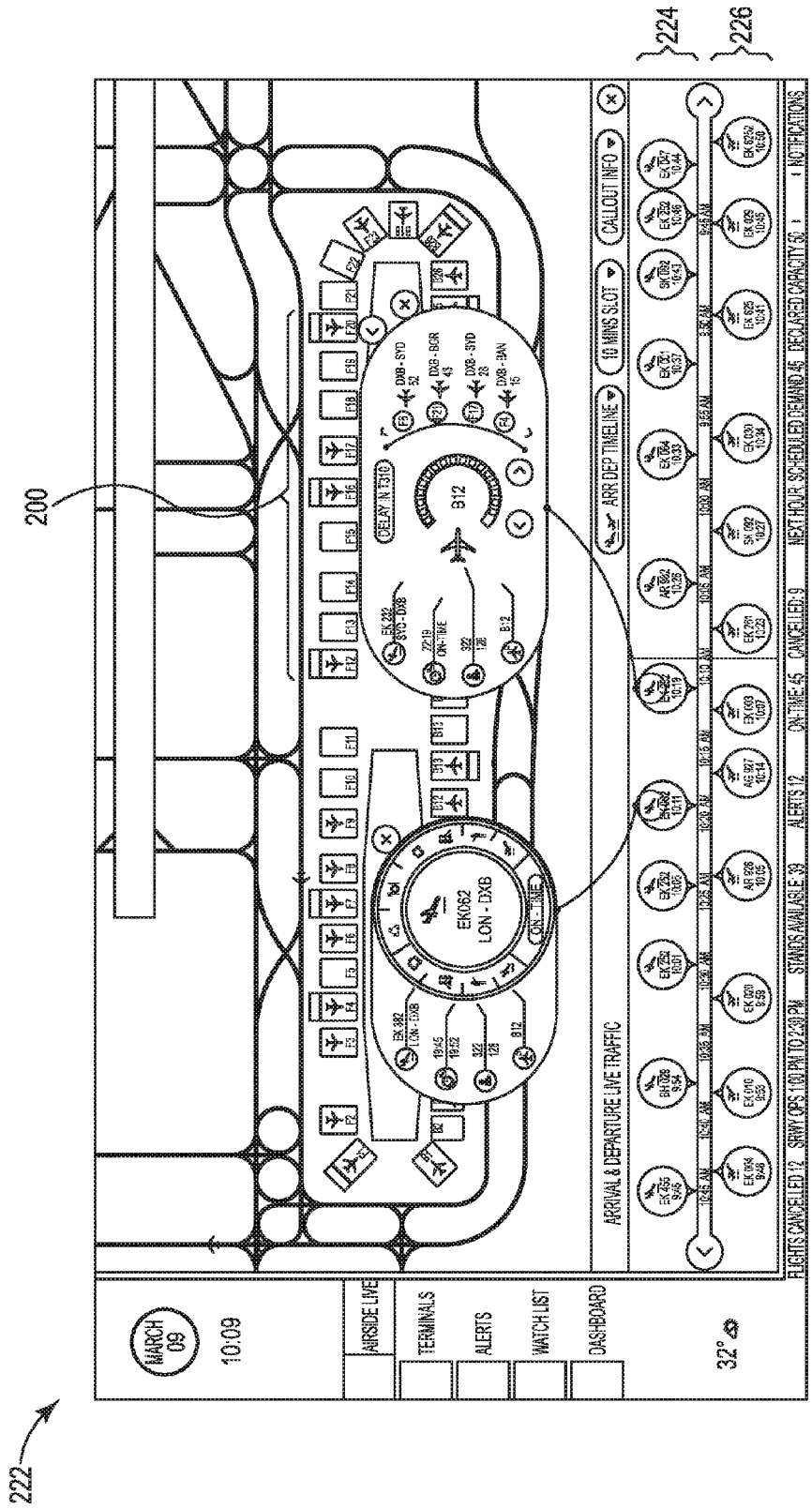
FIG. 2 is an illustration of a display provided on a user interface showing an airport layout, generated in accordance with one or more embodiments of the present disclosure.

FIG. 2 is an illustration of a display provided on a user interface (e.g., user interface 976, as described in connection with FIG. 9) showing an airport layout 222, generated in accordance with one or more embodiments of the present disclosure. As shown in FIG. 2, the airport layout 222 can include an aircraft turnaround status analysis 200 (e.g., aircraft turnaround status analysis 100, previously described in connection with FIG. 1), inbound flights 224, and outbound flights 226, which can be displayed in a single integrated display, as illustrated in FIG. 2.

Airport layout 222 can display to a user airside operations of an airport. For example, the user can determine, using airport layout 222, inbound flights 224 and their associated arrival times, as well as outbound flights 226 and their associated departure times. Inbound flights 224 can include arrival time as well as flight number of a number of inbound flights in a selected time period, which may include the inbound flight (e.g., inbound flight number 108, previously described in connection with FIG. 1). For example, inbound flights 224 include the arrival time and flight number of a number of inbound flights at the airport in a one hour time period. Outbound flights 226 can include departure time as well as the flight number of a number outbound flights in the selected time period. The time period can be selected by a user, and can include a time period longer or shorter than one hour.

The inbound flights 224 and outbound flights 226 can be displayed on a timeline, as illustrated in FIG. 2. Using the timeline, a user can quickly and easily determine when a flight may be arriving and when a flight may be departing.

Airport layout 222 can display aircraft turnaround status analysis 200 as a single integrated display overlaid on airport layout 222. As previously described in connection with FIG. 1, the aircraft turnaround status analysis 200 can include flight information for a selected inbound flight, assigned gate information for the selected inbound flight, and connecting flight information for a number of connecting passengers aboard the selected inbound flight.

A user may select, by a user input to a computing device (e.g., computing device 970, described in connection with FIG. 9), a different inbound flight 224. In response to the selection of the different flight, the airport layout 222 can display an aircraft turnaround analysis for the different flight, including flight information for the different selected inbound flight, assigned gate information for the different selected inbound flight, and connecting flight information for a number of connecting passengers aboard the different selected inbound flight.

A user can change, by a user input to the computing device, an assigned gate number of the inbound flight from a first assigned gate number to a second assigned gate number. For example, a user may change the selected flight (e.g., flight EK 252), from gate B12 to a different gate in the airport. For example, the user may change the gate of flight EK 252 from gate B12 to gate B35, as will be further described with respect to FIG. 3.

The user may change the gate of a selected flight to any available gate. In some examples, the user may change the gate of a selected flight to a gate that is available for a selectable time period. That is, the gate may be changed to any gate that is not currently occupied by an aircraft, or to a gate that may be available for a selectable and/or modifiable time period (e.g., available for the next one hour, two hours, etc.) For example, as shown in FIG. 2, gates F10, F11, F13, F14, F15, may be available gates the user may change the gate of the selected flight to. Gates that are currently occupied by an aircraft may not be available for selection.

FIG. 3 is an illustration of a display provided on a user interface (e.g., user interface 976, as described in connection with FIG. 9) showing an airport layout 322 (e.g., airport layout 222, previously described in connection with FIG. 2) including a revised aircraft turnaround status analysis 330, generated in accordance with one or more embodiments of the present disclosure. The revised aircraft turnaround status analysis 330 can include revised assigned gate information 334 for the inbound flight and revised connecting flight information 336 for a number of connecting passengers aboard the inbound flight, which can be displayed in a single integrated display, as illustrated in FIG. 3.

As shown in FIG. 3, the revised aircraft turnaround status analysis 330 illustrates a gate change from gate B12, previously shown in FIG. 2, to gate B35. For example, a user may change, by a user input to a computing device (e.g., computing device 970, described in connection with FIG. 9), the gate from B12 to gate B35. The aircraft turnaround analysis may be revised for gate B35 based on the change in the assigned gate number.

The revised aircraft turnaround status analysis 330 can include revised assigned gate information 334 for the selected inbound flight and revised connecting flight information 336 for a number of connecting passengers aboard the selected inbound flight.

The revised assigned gate information 334 may include revised delay information. The likelihood of delay for the number of connecting passengers on the inbound flight may change based on the change in assigned gate number of the inbound flight. For example, as shown in FIG. 3, the delay meter is slightly less than half full based on the inbound flight being assigned to gate B35. The change in assigned gate number may result in the changed gate being closer to connecting gates for the number of connecting passengers and as a result, the likelihood of delay experienced by the number of connecting passengers transiting from gate B35 to gates of connecting flights may be lower because gate B35 is geographically closer to the connecting gates than gate B12.

The revised connecting flight information 336 may include revised delay information associated with each respective connecting flight. For example, gate F6 may be located geographically closer to gate B35 than gate B12, and as a result, connecting passengers from the inbound flight may have a lower likelihood of experiencing a delay when transiting from gate B35 to gate F6. Similarly, gate F21 may also be geographically closer to gate B35 and result in a lower likelihood of connecting passengers experiencing a delay.

Although not shown in FIG. 3 for clarity and so as not to obscure embodiments of the present disclosure, connecting flight information 336 can include other aircraft that may be affected by the change of the assigned gate number. For example, other aircraft arriving at or already at the airport may be impacted by the change of the assigned gate number of the aircraft; for instance, revised delay information for the other aircraft may be shown, where the revised delay information for the other aircraft is a result of the change of the assigned gate number of the aircraft.

Although reasons for changes in likelihood of delay are described as including relative geographic locations of gates, embodiments of the disclosure are not so limited. In some examples, passengers transiting between gate B12 and gate F17 may need to exit and re-enter security gates, whereas passengers may not need to exit and re-enter security gates when transiting between gate B35 and gate F17, resulting in a lower likelihood of experiencing a delay. In some examples, passengers transiting between gate B12 and gate F4 may need to pass through a customs/immigration checkpoint, whereas passengers transiting between gate B35 and gate F4 may not need to do so, resulting in a lower likelihood of experiencing delay.

Although a user may change the gate of a selected flight resulting in revised aircraft turnaround status analysis 330, the actual assigned gate of the aircraft is not changed. However, the revised aircraft turnaround status analysis 330 may be transmitted to air traffic control for the airport. Air traffic control for the airport may then reassign the inbound flight from gate B12 to gate B35.

Figure 4:
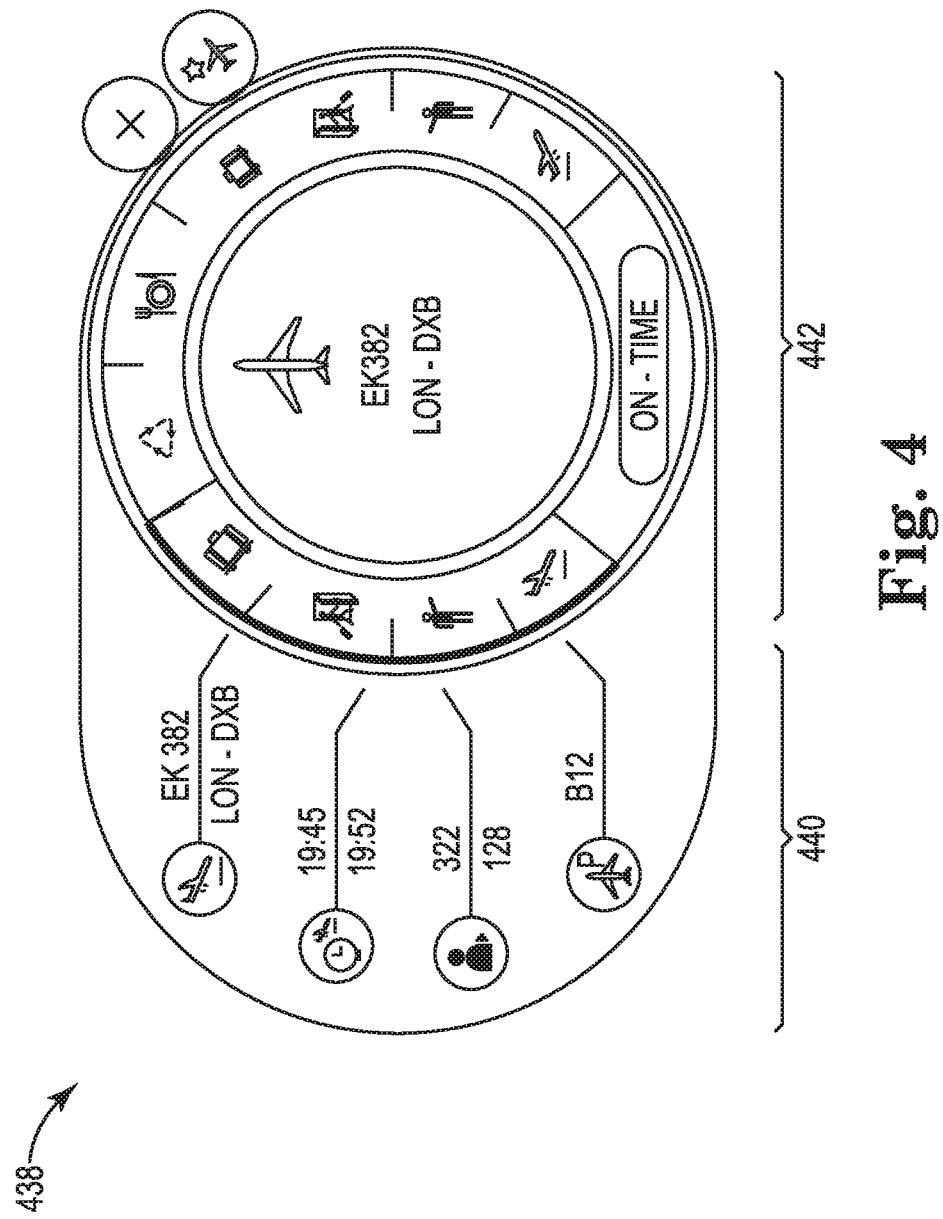
FIG. 4 is an illustration of a display provided on a user interface showing an aircraft gate turnaround analysis, in accordance with one or more embodiments of the present disclosure.

FIG. 4 is an illustration of a display provided on a user interface (e.g., user interface 976, as described in connection with FIG. 9) showing an aircraft gate turnaround analysis 438, in accordance with one or more embodiments of the present disclosure. As shown in FIG. 4, the aircraft gate turnaround analysis 438 includes inbound flight information 440 for a selected flight and aircraft turnaround progress information 442, which can be displayed in a single integrated display, as illustrated in FIG. 4.

The aircraft gate turnaround analysis 438 can be generated by a computing device (e.g., computing device 970, as described in connection with FIG. 9) based on flight information associated with an airport, received by the computing device. The aircraft gate turnaround analysis can include inbound flight information 440 for a selected flight, aircraft turnaround progress information 442 for the flight, outbound flight information for the flight, and delay information for the flight.

The inbound flight information 440 can include an inbound flight number (e.g., flight EK 382), an inbound flight route (e.g., LON to DXB), a scheduled inbound flight arrival time (e.g., 19:45), and an actual inbound flight arrival time (e.g., 19:52). The inbound flight information 440 can include a number of total passengers aboard the inbound flight (e.g., 322 total passengers) and a number of connecting passengers aboard the inbound flight (e.g., 128 connecting passengers).

The aircraft turnaround progress information 442 can include arrival process information for the flight. As used herein, arrival process information for the flight refers to processes performed when an aircraft arrives at a destination airport. Arrival process information can include putting wheel chocks under aircraft wheels, setting marker cones, connecting a ground power unit to the aircraft, connecting a jet bridge to the aircraft, deboarding passengers, cleaning the aircraft cabin, unloading passenger baggage, unloading cargo, draining the lavatory, etc.

Although specific examples of arrival process information are described above, embodiments of the present disclosure are not so limited to the above described examples. For instance, arrival process information may include more or less processes when an aircraft arrives at a destination airport. In some examples, the number of arrival processes may be dependent on the size of the airport, the size of the aircraft, or a combination thereof.

The aircraft turnaround progress information 442 can include departure process information for the flight. As used herein, departure process information for the flight refers to typical processes performed when an aircraft is preparing to depart a destination airport. Departure process information can include catering, refueling the aircraft, water cartage, loading passenger baggage, loading cargo, cooling and/or heating changes to the aircraft cabin, boarding passengers, disconnecting the jet bridge from the aircraft, disconnecting the ground power unit from the aircraft, utilizing a jet/air starter as necessary for the aircraft, removing marker cones, removing wheel chocks, aircraft pushback from the gate, etc.

Although specific examples of departure process information are described above, embodiments of the present disclosure are not so limited to the above described examples. For instance, the number of departure processes may be dependent on the size of the airport, the size of the aircraft, or a combination thereof.

As shown in FIG. 4, arrival and/or departure process information can include corresponding icons. The icons can indicate to a user the status of the flight turnaround progress. For instance, as shown in FIG. 4, arrival process information for the flight can be represented by icons that represent milestones in the aircraft turnaround process. For instance, an icon that is lit up and/or colored green can indicate the process is completed. In some examples, the icon can be colored yellow to indicate the process is in progress. In some examples, an icon that is greyed out can indicate the process is not yet complete.

The delay information for the flight can include a delay in the aircraft turnaround progress information 442 of the flight. In some examples, an icon may be colored red to indicate a delay associated with the particular flight turnaround process. In some examples, an icon may continuously blink to indicate a delay.

A user may add, remove, configure, and/or modify certain arrival and/or departure processes. For instance, airport size and/or aircraft size may deem certain processes as unnecessary. A user may therefore add, remove, configure, and/or modify the processes accordingly.

Although not shown in FIG. 4 for clarity and so as not to obscure embodiments of the present disclosure, the aircraft gate turnaround analysis 438 can include outbound flight information for the flight. Outbound flight information can include an outbound flight number and outbound flight route, a scheduled flight departure time and/or an actual flight departure time, a number of total outbound passengers aboard the outbound flight, and an assigned gate of the outbound flight.

A user may change, by a user input to the computing device, a selected flight from a first flight to a second flight. For example, a user may want to view two flights when one or more flights of the airport may be interdependent due to connecting passengers between the flights, as will be further described in connection with FIG. 5.

The computing device may revise the aircraft turnaround analysis based on the change in the selected flight. For example, the computing device may generate an aircraft turnaround analysis for the second flight, where the aircraft turnaround analysis includes inbound flight information for the second flight, flight turnaround progress information for the second flight, and/or delay information for the second flight.

Figure 5:
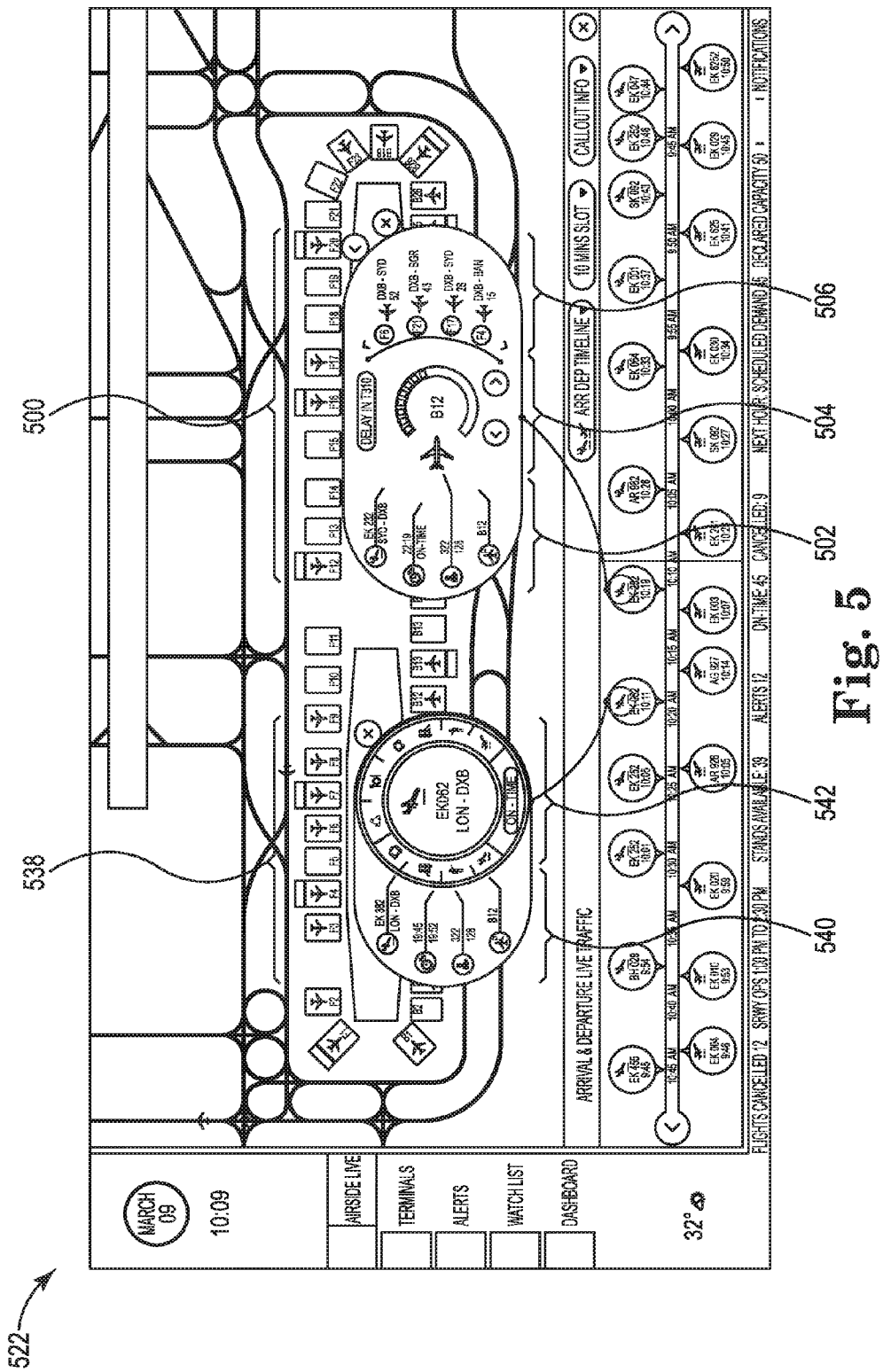
FIG. 5 is an illustration of a display provided on a user interface showing an airport layout including an aircraft turnaround status analysis and an aircraft gate turnaround analysis, in accordance with one or more embodiments of the present disclosure.

FIG. 5 is an illustration of a display provided on a user interface (e.g., user interface 976, as described in connection with FIG. 9) showing an airport layout 522 (e.g., airport layout 222, previously described in connection with FIG. 2) including an aircraft turnaround status analysis 500 (e.g., aircraft turnaround status analysis 100, 200, previously described in connection with FIGS. 1 and 2, respectively) and an aircraft gate turnaround analysis 538 (e.g., aircraft gate turnaround analysis 438, previously described in connection with FIG. 4), in accordance with one or more embodiments of the present disclosure. The airport layout 522, aircraft turnaround status analysis 500, and aircraft gate turnaround analysis 538 can be displayed in a single integrated display, as illustrated in FIG. 5.

As shown in FIG. 5, an aircraft turnaround status analysis 500 for a selected flight among a number of flights associated with an airport, and an aircraft gate turnaround analysis 538 can be generated and displayed on a single, integrated display. Displaying the aircraft turnaround status analysis 500 and the aircraft gate turnaround analysis 538 simultaneously on a single display can allow for a user to quickly determine progress information on multiple flights. This may be useful in situations where two flights may depend on each other. For instance, a delay in an aircraft gate turnaround may affect (e.g., delay) an inbound flight and the passengers aboard the inbound flight. A user may then make a determination to change the assigned gate of the inbound flight to generate a revised aircraft turnaround status analysis (e.g., revised aircraft turnaround status analysis 330, previously described in connection with FIG. 3). The user may determine the revised gate assignment may result in less of a delay, and send the revised gate information to air traffic control associated with the airport.

Similar to the embodiment described in FIG. 4, the aircraft gate turnaround analysis 538 can include inbound flight information 540 for a selected flight (e.g., inbound flight information 440, previously described in connection with FIG. 4) and aircraft turnaround progress information 542 (e.g., aircraft turnaround progress information 442, previously described in connection with FIG. 4). Although not shown in FIG. 5 for clarity and so as not to obscure embodiments of the present disclosure, the aircraft gate turnaround progress 538 can include outbound flight information for the selected flight and delay information for the selected flight.

Similar to the embodiment described in FIG. 1, the aircraft turnaround status analysis 500 can include inbound flight information 502 (e.g., inbound flight information 102, previously described in connection with FIG. 1), assigned gate information 504 for the inbound flight (e.g., assigned gate information 104, previously described in connection with FIG. 1), and connecting flight information 506 for a number of connecting passengers aboard the inbound flight (e.g., connecting flight information 106, previously described in connection with FIG. 1). Delay information associated with the inbound flight may be sent to an APOC associated with the airport for analysis. In some embodiments, delay information associated with the inbound flight may be sent to a mobile device of a user (e.g., an APOC supervisor or other APOC employee).

As used herein, a mobile device can include devices that are (or can be) carried and/or worn by the user. For example, a mobile device can be a phone (e.g., a smartphone, a tablet, a personal digital assistant (PDA), smart glasses, and/or a wrist-worn device (e.g., a smart watch), among other types of mobile devices.

A user may change the assigned gate information 504 for a selected flight from an assigned gate to a revised gate, where the revised gate has a delay for the connecting passengers aboard the flight that is less than a delay for the assigned gate. For example, a user may determine the delay of gate F14 is too high, and switch the gate from F14 to B12. As shown in FIG. 5, the delay meter associated with gate B12 indicates slightly less than a medium likelihood of delay, which may be an acceptable amount of a likelihood of delay.

A user may select a different flight shown on FIG. 5 for analysis. For example, a user may want to determine turnaround information for a different flight. As a result of selecting the different flight, an aircraft gate turnaround analysis and an aircraft turnaround status analysis may be generated for the different flight.

Figure 6:
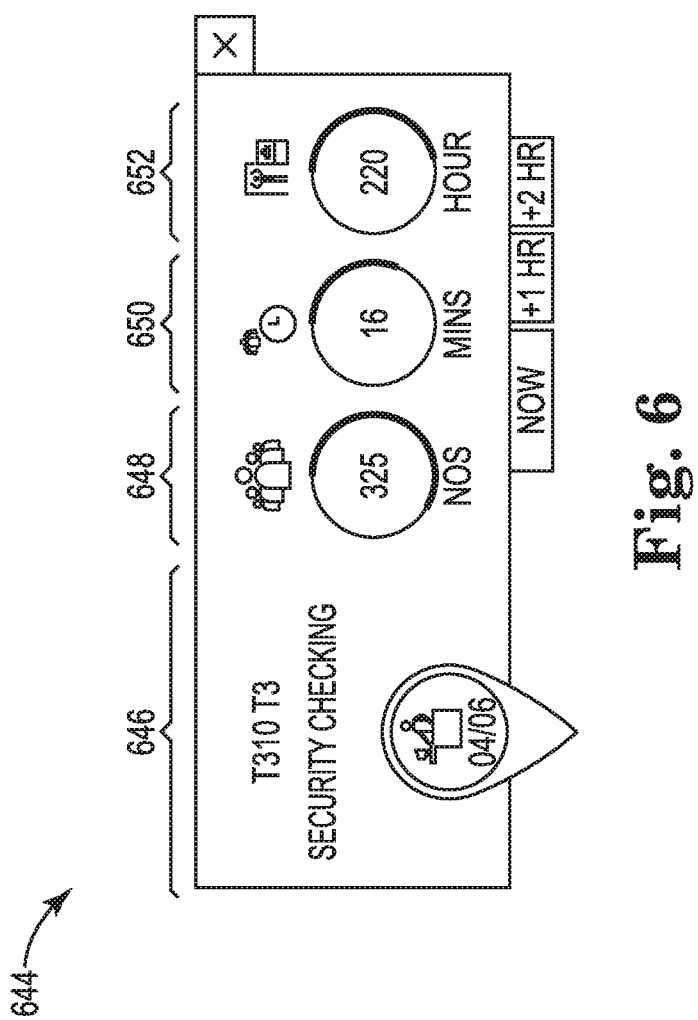
FIG. 6 is an illustration of a display provided on a user interface showing an airport terminal status analysis, generated in accordance with one or more embodiments of the present disclosure.

FIG. 6 is an illustration of a display provided on a user interface (e.g., user interface 976, as described in connection with FIG. 9) showing an airport terminal status analysis 644, generated in accordance with one or more embodiments of the present disclosure. As shown in FIG. 6, the airport terminal status analysis 644 can include a status of a checkpoint 646, a number of passengers in a queue at the checkpoint 648, an amount of time taken by one of the number of passengers to pass through the queue at the checkpoint 650, and a rate at which a number of passengers pass through the queue at the checkpoint 652, which can be displayed in a single integrated display, as illustrated in FIG. 6.

The airport terminal status analysis 644 can be generated by a computing device (e.g., computing device 970, as described in connection with FIG. 9) based on airport terminal information associated with an airport received by the computing device. Airport terminal status analysis can be used by a user to gain information regarding the status of terminal side airport operations, as will be further described herein.

Airport terminal information can be received by the computing device from flight information systems associated with the airport and/or other airports, an airport operations database associated with the airport and/or other airports, and/or another third party system. For example, airport terminal information can be obtained through video analytics (e.g., cameras located in and/or around the airport terminal), user data, and/or other third party system data.

The airport terminal status analysis 644 can include a status of a checkpoint 646. For example, the status of a checkpoint 646 can include the location of a checkpoint, the type of checkpoint, and/or a number of counters of the checkpoint that are open out of a total number of counters of the checkpoint. For instance, as shown in FIG. 6, the status of the checkpoint 646 indicates the checkpoint is checkpoint number T310, located in terminal 3 of an associated airport. The status of checkpoint 646 indicates that the checkpoint is a "security checking" checkpoint, and that four counters out of a total number of six counters are open for security checking.

As used herein, a checkpoint counter can include a station of a checkpoint at which a passenger may be helped and/or otherwise interacted with by airport and/or airline personnel. In some examples, a checkpoint such as an airline check-in counter may include a number of check-in counters to assist passengers in checking in to flights, receiving boarding passes, dropping off checked luggage, etc. In some examples, a checkpoint such as a security checkpoint may include a number of checkpoint counters (e.g., security counters/gates) to screen passengers for security before passengers may enter the airport terminal and/or board aircraft.

Although not shown in FIG. 6 for clarity and so as not to obscure embodiments of the present disclosure, the status of a checkpoint 646 can indicate delay information about the checkpoint. For example, the status of the checkpoint 646 may include a color coded icon, such as the "open counters" icon, to indicate delay information about the checkpoint. For instance, the icon can be green to indicate low to no delay, yellow to indicate minor to moderate delay, and red to indicate significant delay.

The airport terminal status analysis 644 can include a number of passengers in a queue at the checkpoint 648. For example, as shown in FIG. 6, a queue associated with checkpoint T310 includes 325 people.

The airport terminal status analysis 644 can include an amount of time taken by one of the number of passengers to pass through the queue at the checkpoint 650. For example, as shown in FIG. 6, a 16 minute wait time is indicated to pass through the queue that includes 325 people at checkpoint T310.

The airport terminal status analysis 644 can include a rate at which a number of passengers pass through the queue at the checkpoint 652. For example, as shown in FIG. 6, 220 people per hour are currently passing through checkpoint T310. The rate can be modifiable. For instance, the airport terminal status analysis 644 can show the number of passengers that pass through the queue at the checkpoint per hour, per minute, per day, etc.

Although described as including a rate at which a number of passengers pass through the queue at the checkpoint 652, embodiments of the present disclosure are not so limited. For example, the airport terminal status analysis 644 can include a time taken to transit from one point or area in the airport terminal to another. For instance, the airport terminal status analysis 644 can include a time taken to transit from a checkpoint to a departure gate, or from one gate to another gate. That is, the airport terminal status analysis 644 can include an amount of time taken by one of the number of passengers to pass from the selected checkpoint to another checkpoint.

A user may change, by an input to the computing device, a number of checkpoints that are open from a first number of checkpoints that are open to a second number of checkpoints that are open. For example, a user may increase or decrease the number of counters that are open at checkpoint T310. For instance, the user may increase the number of counters from four, to five or six. The increase in open counters may in response to long queues at checkpoint T310 (e.g., an increase in the number of passengers in a queue at the checkpoint 648), and/or an increase in the amount of time taken by one of the number of passengers to pass through the queue at the checkpoint 650, among other factors.

As an additional example, the user may decrease the number of counters from four to less than four. The decrease in open counters may be in response to shorter queues at checkpoint T310 (e.g., a decrease in the number of passengers in a queue at the checkpoint 648), a decrease in the amount of time taken by one of the number of passengers to pass through the queue at the checkpoint 650, a decrease in the amount of time taken by one of the number of passengers to reach a destination departure gate, a total time to pass through the queue at the checkpoint 650 and reach the destination departure gate, and/or the result of shift changes/employees leaving, among other factors.

The airport terminal status analysis 644 can be revised based on the change in the number of checkpoints that are open. For example, an increase in the number of checkpoints (e.g., counters) at checkpoint T310 may result a reduction in the amount of time taken by one of the number of passengers to pass through the queue at the checkpoint 650, and may correspondingly result in an increase in the rate at which the number passengers pass through the queue at the checkpoint 652. As a result, the computing device can revise the airport terminal status analysis based on the change in the number of checkpoints that are open.

The computing device can transmit a request to modify the number of checkpoints that are open based on a user input to the computing device. For example, a revised airport terminal status analysis may indicate a lower amount of time taken by one of the number of passengers to pass through the queue at the checkpoint 650 and/or an increase in the rate at which the number of passengers pass through the queue at the checkpoint 652. A user may choose to transmit a request to open additional counters at checkpoint T310 based on the revised airport terminal status analysis.

A user can utilize an airport terminal status analysis to quickly determine the status of terminal side airport operations. Using this analysis, a user such as an APOC supervisor can decide on terminal side infrastructure allocation to process and/or clear delays. Further, the APOC can easily determine passenger information regarding the terminal in an emergency situation. Using the airport terminal status analysis can lead to less delays in the airport terminal, allowing for higher passenger throughput.

Figure 7:
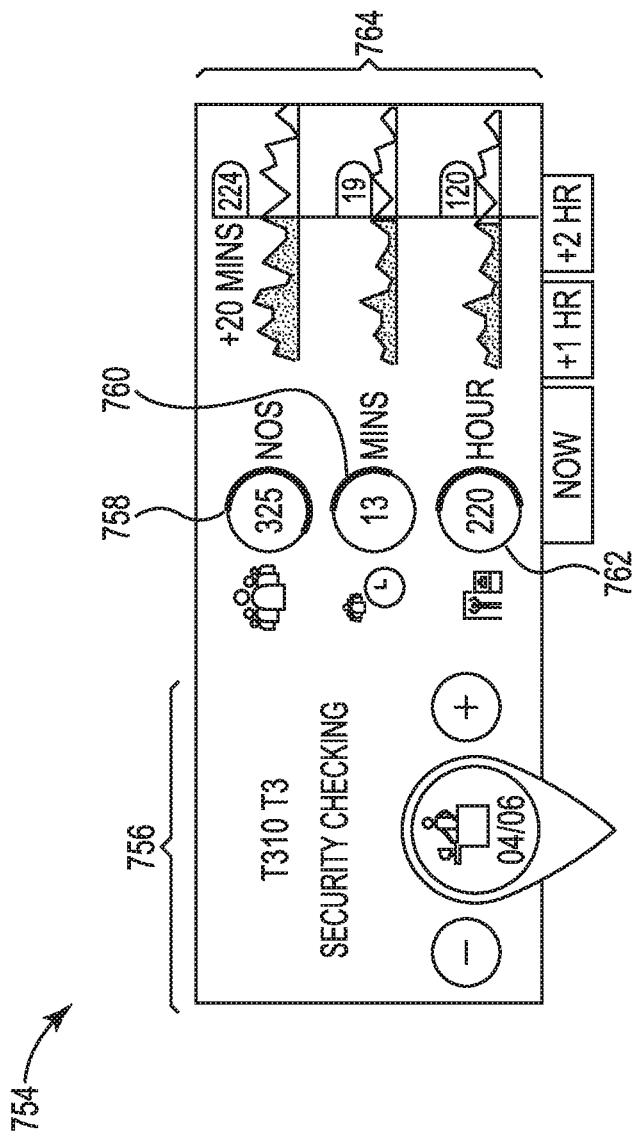
FIG. 7 is an illustration of a display provided on a user interface showing a forecasted airport terminal status analysis, in accordance with one or more embodiments of the present disclosure.

FIG. 7 is an illustration of a display provided on a user interface (e.g., user interface 976, as described in connection with FIG. 9) showing a forecasted airport terminal status analysis 754, generated in accordance with one or more embodiments of the present disclosure. As shown in FIG. 7, the forecasted airport terminal status analysis 754 can include a forecasted status of a checkpoint 756, a forecasted number of passengers in a queue at the checkpoint 758, a forecasted amount of time taken by one of the number of passengers to pass through the queue at the checkpoint 760, a forecasted rate at which a number of passengers pass through the queue at the checkpoint 762, and graphs of projected changes over time of the forecasted status of the checkpoint 764, which can be displayed in a single integrated display, as illustrated in FIG. 7.

The forecasted airport terminal status analysis 754 can be generated by a computing device (e.g., computing device 970, as described in connection with FIG. 9). For example, the computing device can receive a user input to generate the forecasted airport terminal status analysis 754. As used herein, a forecasted airport terminal status analysis can be a prediction of the status of a checkpoint for an amount of time in the future. The forecasted airport terminal status analysis can be based on a current airport terminal status analysis (e.g., airport terminal status analysis 644, previously described in connection with FIG. 6).

The forecasted airport terminal status analysis 754 can be for a predefined future time. For example, the predefined future time can be one hour in the future, two hours in the future, or some other predefined future time. For example, the user may specify a predefined future time for the forecasted airport terminal status analysis 754.

The forecasted airport terminal status analysis 754 can include a forecasted status of a checkpoint 756. The forecasted status of a checkpoint 756 can include the location of a checkpoint, the type of checkpoint, and/or a number of counters of the checkpoint that are open. The forecasted status of checkpoint 756 indicates that the forecasted airport terminal status analysis 754 is based on four counters out of a total number of six counters being open for security checking.

Similar to the embodiment described in FIG. 6, the forecasted status of the checkpoint 756 can indicate forecasted delay information about the checkpoint. For example, the forecasted status of the checkpoint 756 may include a color coded icon, such as the "open counters" icon, to indicate delay information about the checkpoint. For instance, the icon can be green to indicate low to no delay, yellow to indicate minor to moderate delay, and red to indicate significant delay.

The forecasted airport terminal status analysis 754 can include a forecasted number of passengers in a queue at the checkpoint 758. For example, as shown in FIG. 7, the forecasted airport terminal status analysis 754 indicates that in one hour, it is predicted that a queue associated with checkpoint T310 may include 325 people.

Although not shown for clarity and so as not to obscure embodiments of the present disclosure, the forecasted airport terminal status analysis 754 can show a rate of change of the number of passengers in the queue (e.g., the queue is increasing or decreasing by a number of passengers per unit of time). For instance, the forecasted airport terminal status analysis 754 can show that the queue is increasing at a rate of five passengers per minute, although embodiments of the present disclosure are not limited to a rate of change per unit of time of a number of passengers per minute. For example, the rate of change can include passengers per hour, per day, etc.

The forecasted airport terminal status analysis 754 can include a forecasted amount of time taken by one of the number of passengers to pass through the queue at the checkpoint 760. For example, the forecasted airport terminal status analysis 754 indicates that in one hour, it is predicted that 13 minutes may be required to pass through a queue at checkpoint T310.

The forecasted airport terminal status analysis 754 can include a forecasted rate at which a number of passengers pass through the queue at the checkpoint 762. For example, the forecasted airport terminal status analysis 754 indicates that in one hour, it is predicted that 220 people per hour may pass through checkpoint T310.

The forecasted airport terminal status analysis 754 can include a graph of projected and/or past changes 764 over time of the forecasted status of the checkpoint 764. For example, the graph of projected changes 764 indicates that one hour in the future, checkpoint T310 may be experiencing peak passenger activity, and that beyond the next one hour, the forecasted number of passengers in the queue at the checkpoint 758, the forecasted amount of time taken for the number of passengers to pass through the queue at the checkpoint 760, and the rate at which the forecasted number of passengers that may pass through the queue at the checkpoint 762 may all decrease.

A user can slide a cursor along the graphs of projected changes 764 over time of the forecasted status of the checkpoint. In some examples, a user may slide the cursor forwards to check projected changes 764 for a time in the future (e.g., five minutes in the future). In some examples, a user may slide the cursor backwards to check projected changes 764 for a time that may be slightly less in the future (e.g., three minutes in the future), or to check the airport terminal status analysis for a time in the past.

Figure 8:
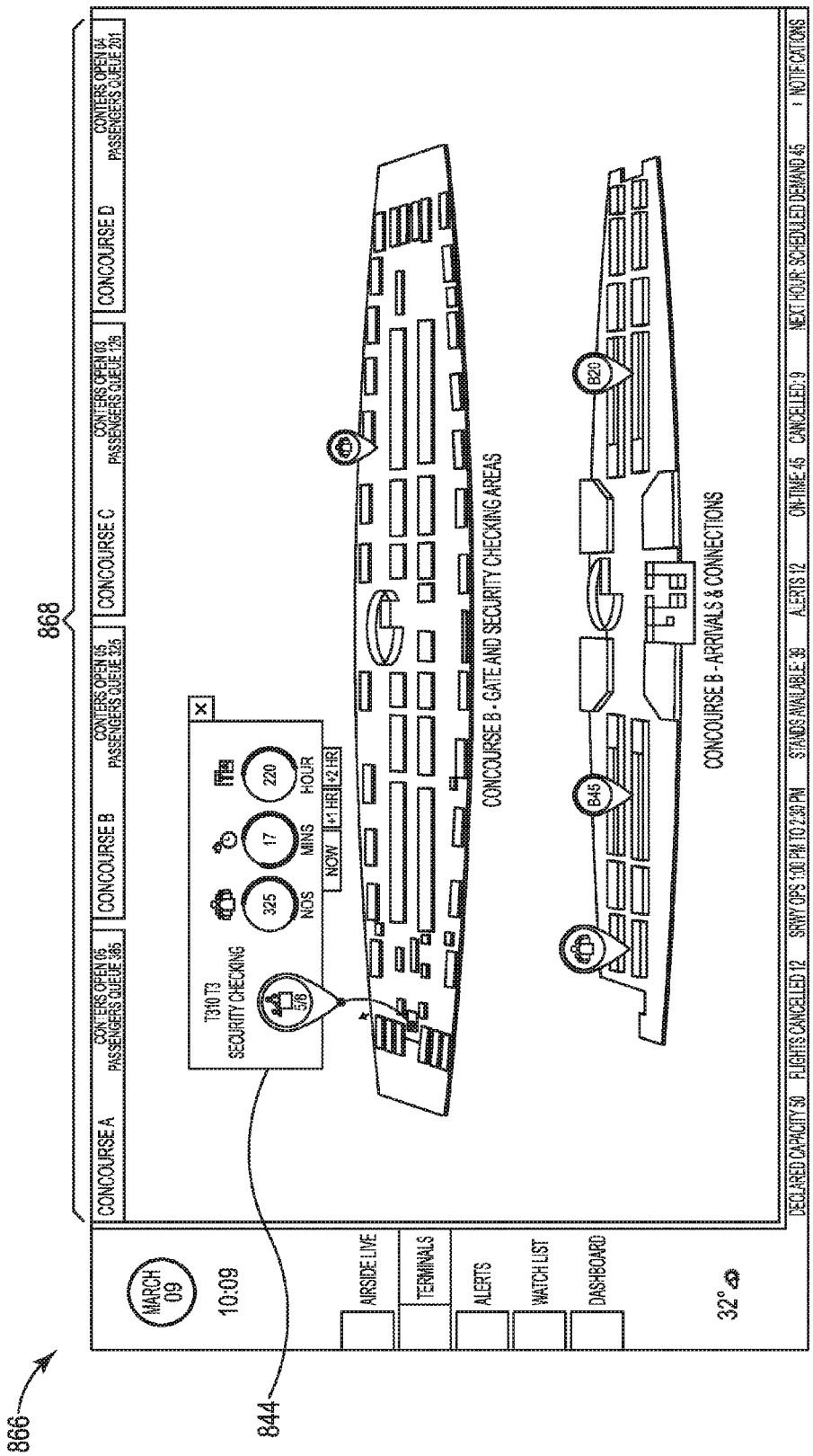
FIG. 8 is an illustration of a display provided on a user interface showing a terminal layout and an airport terminal status analysis, in accordance with one or more embodiments of the present disclosure.

FIG. 8 is an illustration of a display provided on a user interface (e.g., user interface 976, as described in connection with FIG. 9) showing a terminal layout 866 and an airport terminal status analysis 844 (e.g., airport terminal status analysis 644, previously described in connection with FIG. 6), generated in accordance with one or more embodiments of the present disclosure. The terminal layout 866 and airport terminal status analysis 844 can be displayed in a single integrated display, as illustrated in FIG. 8.

The airport terminal status analysis 844 can include status information for a number of concourses of the airport, including status information 868 for a number of checkpoints associated with each respective concourse. For example, the airport terminal status analysis 844 includes information regarding checkpoint T310, a security checking checkpoint in Concourse B of the airport. Checkpoint T310 may be one of a number of checkpoints associated with Concourse B.

Status information 868 for a number of checkpoints associated with each respective concourse can include counters of a selected checkpoint that are open, and passengers in the particular queue associated with the selected checkpoint. For instance, as shown in FIG. 8, checkpoint T310 is located in Concourse B, has five counters open, and includes a queue of passengers that includes 325 passengers.

Although status information 868 is shown in FIG. 8 as including the counters of the selected checkpoint and passengers in a queue associated with the selected checkpoint, embodiments of the present disclosure are not so limited. For example, status information 868 for a number of checkpoints associated with each respective concourse can include a total number of counters open and a total number of passengers in queues in a particular concourse. For example, Concourse C may only have three total counters open among the total number of counters of the total number of checkpoints associated with Concourse C, as well as 126 passengers in queues located in Concourse C.

Although not shown in FIG. 8 for clarity and so as not to obscure embodiments of the present disclosure, status information 868 of a number of concourses of the airport can include a number of checkpoints at each respective concourse that are open out of a total number of checkpoints at that respective concourse. For example, Concourse B may include five checkpoints, and only three checkpoints are open out of the five checkpoints.

As previously described in connection with FIG. 7, the computing device may generate a forecasted airport terminal status analysis for a predefined future time based on the airport terminal status analysis 844. The forecasted airport terminal status analysis can include forecasted status information for the number of concourses, a forecasted number of passengers in the queues associated with the checkpoints of each respective concourse, a forecasted amount of time for the forecasted number of passengers to pass through the queues, and a forecasted number of passengers that may pass through the queues of the number of checkpoints per hour.

The computing device can generate a predicted delay for the number of checkpoints based on forecasted status information and flight information associated with the airport. For example, the airport may expect to experience a spike in passenger activity one hour in the future; based on a forecasted airport terminal status analysis, and flight information (e.g., airside operational information for the airport), a predicted delay may be generated for the number of checkpoints.

The computing device may generate an alert in response to the predicted delay for the checkpoints exceeding a predefined threshold. For example, a delay may be predicted indicating that it may take a passenger two hours to clear a security checkpoint. Based on a predefined threshold of a one hour delay, the computing device may alert the user regarding the delay. A user may utilize the alert to perform additional forecasted airport terminal status analysis, and open additional checkpoints as may be needed to handle the predicted increase in passenger traffic at the checkpoint and/or airport.

The alert may include information such as a checkpoint associated with the predicted delay, and/or a concourse of the airport where the checkpoint is located. For example, the alert may inform a user that a delay is predicted at checkpoint T310, and that checkpoint T310 is located in Concourse B of the airport.

A user may change the selected checkpoint from a first checkpoint to a second checkpoint. For example, a user may select, from terminal layout 866, a different checkpoint shown on terminal layout 866.

The computing device may generate and display an airport terminal status analysis after changing the selected checkpoint. For example, the user may select a customs/immigration checkpoint located near gate B45 in Concourse B. An airport terminal status analysis for the customs/immigration checkpoint may be generated and displayed.

FIG. 9 is a computing device 970 for generating an aircraft turnaround and airport terminal status analysis, in accordance with one or more embodiments of the present disclosure. As shown in FIG. 9, computing device 970 can include a user interface 976, memory 974 and a processor 972 configured generate an aircraft turnaround and airport terminal status analysis in accordance with the present disclosure.

Computing device 970 can be, for example, a laptop computer, a desktop computer, and/or a mobile device (e.g., a smart phone, tablet, personal digital assistant, smart glasses, a wrist-worn device, etc.), and/or redundant combinations thereof, among other types of computing devices.

The memory 974 can be any type of storage medium that can be accessed by the processor 972 to perform various examples of the present disclosure. For example, the memory 974 can be a non-transitory computer readable medium having computer readable instructions (e.g., computer program instructions) stored thereon that are executable by the processor 972 to generate an aircraft turnaround and airport terminal status analysis in accordance with the present disclosure. The computer readable instructions can be executable by the processor 972 to redundantly generate the aircraft turnaround analysis and/or the airport terminal status analysis.

The memory 974 can be volatile or nonvolatile memory. The memory 974 can also be removable (e.g., portable) memory, or non-removable (e.g., internal) memory. For example, the memory 974 can be random access memory (RAM) (e.g., dynamic random access memory (DRAM) and/or phase change random access memory (PCRAM)), read-only memory (ROM) (e.g., electrically erasable programmable read-only memory (EEPROM) and/or compact-disc read-only memory (CD-ROM)), flash memory, a laser disc, a digital versatile disc (DVD) or other optical storage, and/or a magnetic medium such as magnetic cassettes, tapes, or disks, among other types of memory.

Further, although memory 974 is illustrated as being located within computing device 970, embodiments of the present disclosure are not so limited. For example, memory 974 can also be located internal to another computing resource (e.g., enabling computer readable instructions to be downloaded over the Internet or another wired or wireless connection).

As shown in FIG. 9, computing device 970 includes a user interface 976. For example, the user interface 976 can display an aircraft turnaround and airport terminal status analysis (e.g., as previously described in connection with FIGS. 1-8) in a single integrated display. A user (e.g., operator) of computing device 970 can interact with computing device 970 via user interface 976. For example, user interface 976 can provide (e.g., display and/or present) information to the user of computing device 970, and/or receive information from (e.g., input by) the user of computing device 970. For instance, in some embodiments, user interface 976 can be a graphical user interface (GUI) that can provide and/or receive information to and/or from the user of computing device 970. The display can be, for instance, a touch-screen (e.g., the GUI can include touch-screen capabilities). Alternatively, a display can include a television, computer monitor, mobile device screen, other type of display device, or any combination thereof, connected to computing device 970 and configured to receive a video signal output from the computing device 970.

As an additional example, user interface 976 can include a keyboard and/or mouse the user can use to input information into computing device 970. Embodiments of the present disclosure, however, are not limited to a particular type(s) of user interface.

User interface 976 can be localized to any language. For example, user interface 976 can display the aircraft turnaround and airport terminal status analysis in any language, such as English, Spanish, German, French, Mandarin, Arabic, Japanese, Hindi, etc.

Although specific embodiments have been illustrated and described herein, those of ordinary skill in the art will appreciate that any arrangement calculated to achieve the same techniques can be substituted for the specific embodiments shown. This disclosure is intended to cover any and all adaptations or variations of various embodiments of the disclosure.

It is to be understood that the above description has been made in an illustrative fashion, and not a restrictive one. Combination of the above embodiments, and other embodiments not specifically described herein will be apparent to those of skill in the art upon reviewing the above description.

The scope of the various embodiments of the disclosure includes any other applications in which the above structures and methods are used. Therefore, the scope of various embodiments of the disclosure should be determined with reference to the appended claims, along with the full range of equivalents to which such claims are entitled.

In the foregoing Detailed Description, various features are grouped together in example embodiments illustrated in the figures for the purpose of streamlining the disclosure. This method of disclosure is not to be interpreted as reflecting an intention that the embodiments of the disclosure require more features than are expressly recited in each claim.

Rather, as the following claims reflect, inventive subject matter lies in less than all features of a single disclosed embodiment. Thus, the following claims are hereby incorporated into the Detailed Description, with each claim standing on its own as a separate embodiment.

What is claimed:

1. A computing device for aircraft turnaround analysis, comprising:
a memory;
a processor configured to execute executable instructions stored in the memory to:
receive flight information and airport terminal information associated with an airport;
generate an aircraft turnaround analysis based on the flight information and the airport terminal information, wherein the aircraft turnaround analysis includes:
flight information for an inbound flight;
assigned gate information for the inbound flight; and
connecting flight information for a number of connecting passengers aboard the inbound flight including delay information comprising a number of color coded icons indicating a likelihood of delay for the number of connecting passengers aboard the inbound flight, wherein a color of the number of color coded icons changes as a result of a change in the likelihood of delay for the number of connecting passengers in response to a change in the assigned gate information for the inbound flight; and
a user interface displaying the aircraft turnaround analysis in a single integrated display.

2. The computing device of claim 1, wherein the flight information for the inbound flight includes:
an inbound flight number and inbound flight route;
a scheduled inbound flight arrival time and an actual inbound flight arrival time; and
a number of total passengers and the number of connecting passengers.

3. The computing device of claim 1, wherein the assigned gate information for the inbound flight includes:
an assigned gate and corresponding gate number for the inbound flight; and
delay information for the inbound flight.

4. The computing device of claim 1, wherein the connecting flight information for the number of connecting passengers aboard the inbound flight includes:
gate numbers of connecting flights for the number of connecting passengers aboard the inbound flight;
flight routes of each respective connecting flight;
a number of passengers connecting to each respective connecting flight; and
delay information associated with each respective connecting flight.

5. The computing device of claim 4, wherein the delay information associated with each respective connecting flight is based on the assigned gate information for the inbound flight and the airport terminal information.

6. The computing device of claim 1, wherein the processor is configured to execute the instructions to change an assigned gate number of the inbound flight from a first assigned gate number to a second assigned gate number in response to a user input to the computing device.

7. The computing device of claim 6, wherein the processor is configured to execute the instructions to revise the aircraft turnaround analysis based on the change in the assigned gate number.

8. The computing device of claim 6, wherein the processor is configured to execute the instructions to transmit the second assigned gate number to air traffic control associated with the airport.

9. A non-transitory computer readable medium having computer readable instructions stored thereon that are executable by a processor to:
receive flight information associated with an airport;
generate an aircraft turnaround analysis based on the flight information, wherein the aircraft turnaround analysis includes:
inbound flight information for a flight;
assigned gate information for the inbound flight;
flight turnaround progress information for the flight;
outbound flight information for the flight;
connecting flight information for a number of connecting passengers aboard the inbound flight including delay information comprising a number of color coded icons indicating a likelihood of delay for the number of connecting passengers aboard the inbound flight, wherein a color of the number of color coded icons changes as a result of a change in the likelihood of delay for the number of connecting passengers in response to a change in the assigned gate information for the inbound flight; and
delay information for the flight; and
display the aircraft turnaround analysis in a single integrated display.

10. The computer readable medium of claim 9, wherein the processor is configured to execute the instructions to change the flight from a first flight to a second flight.

11. The computer readable medium of claim 10, wherein the processor is configured to execute the instructions to revise the aircraft turnaround analysis based on the change in the flight.

12. The computer readable medium of claim 9, wherein the flight turnaround progress information for the flight includes arrival process information for the flight.

13. The computer readable medium of claim 9, wherein the flight turnaround progress information for the flight includes departure process information for the flight.

14. The computer readable medium of claim 9, wherein the outbound flight information for the flight includes:
an outbound flight number and outbound flight route;
a scheduled flight departure time and an actual flight departure time;
a number of total outbound passengers; and
an assigned gate of the flight.

15. The computer readable medium of claim 9, wherein the delay information for the flight includes a delay in the flight turnaround progress information of the flight.

16. A computer implemented method for generating an aircraft turnaround analysis, comprising:
generating, by a computing device, an aircraft gate turnaround analysis for a number of flights associated with an airport, wherein the aircraft gate turnaround analysis includes:
inbound flight information for the number of flights;
assigned gate information for the number of flights; and
connecting flight information for a number of connecting passengers aboard the number of flights;

generating, by the computing device, an aircraft turnaround status analysis for the number of flights, wherein the aircraft turnaround status analysis includes:
  the inbound flight information for the number of flights;
  assigned gate information for the number of flights;
  flight turnaround progress information of the number of flights;
  outbound flight information for the number of flights;
  connecting flight information for the number of connecting passengers aboard the number of flights including delay information comprising a number of color coded icons indicating a likelihood of delay for the number of connecting passengers aboard the number of flights, wherein a color of the number of color coded icons changes as a result of a change in the likelihood of delay for the number of connecting passengers in response to a change in the assigned gate information for the number of flights; and
  delay information for the number of flights; and
displaying, on a user interface of the computing device, the aircraft gate turnaround analysis and the aircraft turnaround status analysis for a selected flight among the number of flights in a single integrated display.

17. The method of claim 16, wherein the method includes changing the assigned gate information for the selected flight from an assigned gate to a revised gate, wherein the revised gate has a delay for the connecting passengers aboard the flight that is less than a delay for the assigned gate.

18. The method of claim 16, wherein the method includes sending the delay information for the selected flight to at least one of:
  an airport operations control center of the airport; and
  a mobile device of a user.

19. The method of claim 16, wherein the method includes receiving a selection of a different flight among the number of flights associated with the airport.

20. The method of claim 19, wherein the method includes displaying, by the computing device:
  an aircraft gate turnaround analysis for the different flight; and
  an aircraft turnaround status analysis for the different flight.

* * * * *